Jan. 15, 1935.  C. O. J. MONTELIUS  1,987,698
HYDRAULIC DRIVING MEANS FOR VEHICLES HAVING MULTIWHEEL DRIVE
Filed March 12, 1931   4 Sheets-Sheet 1
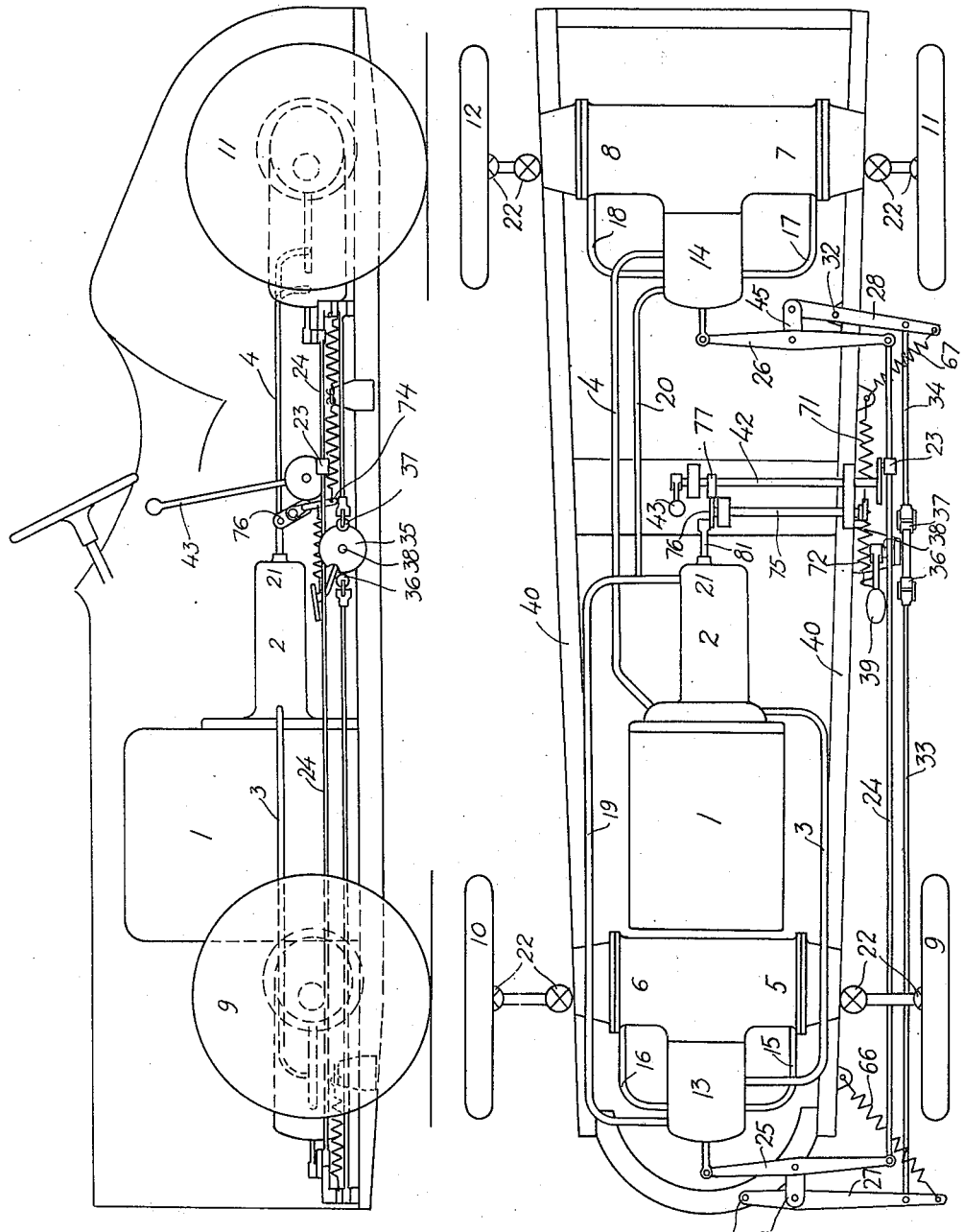
Inventor
Carl Oscar Josef Montelius
By Attys

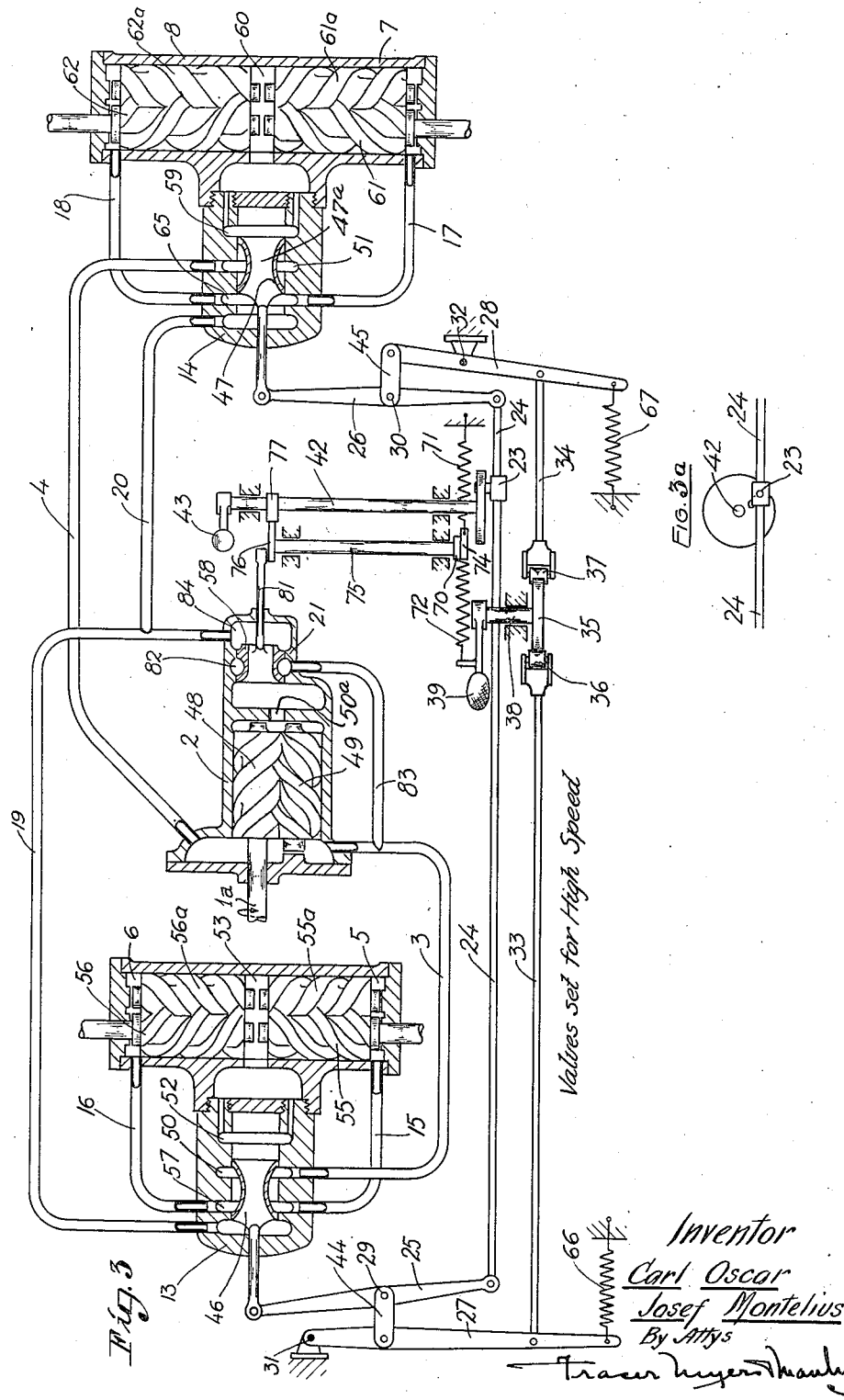

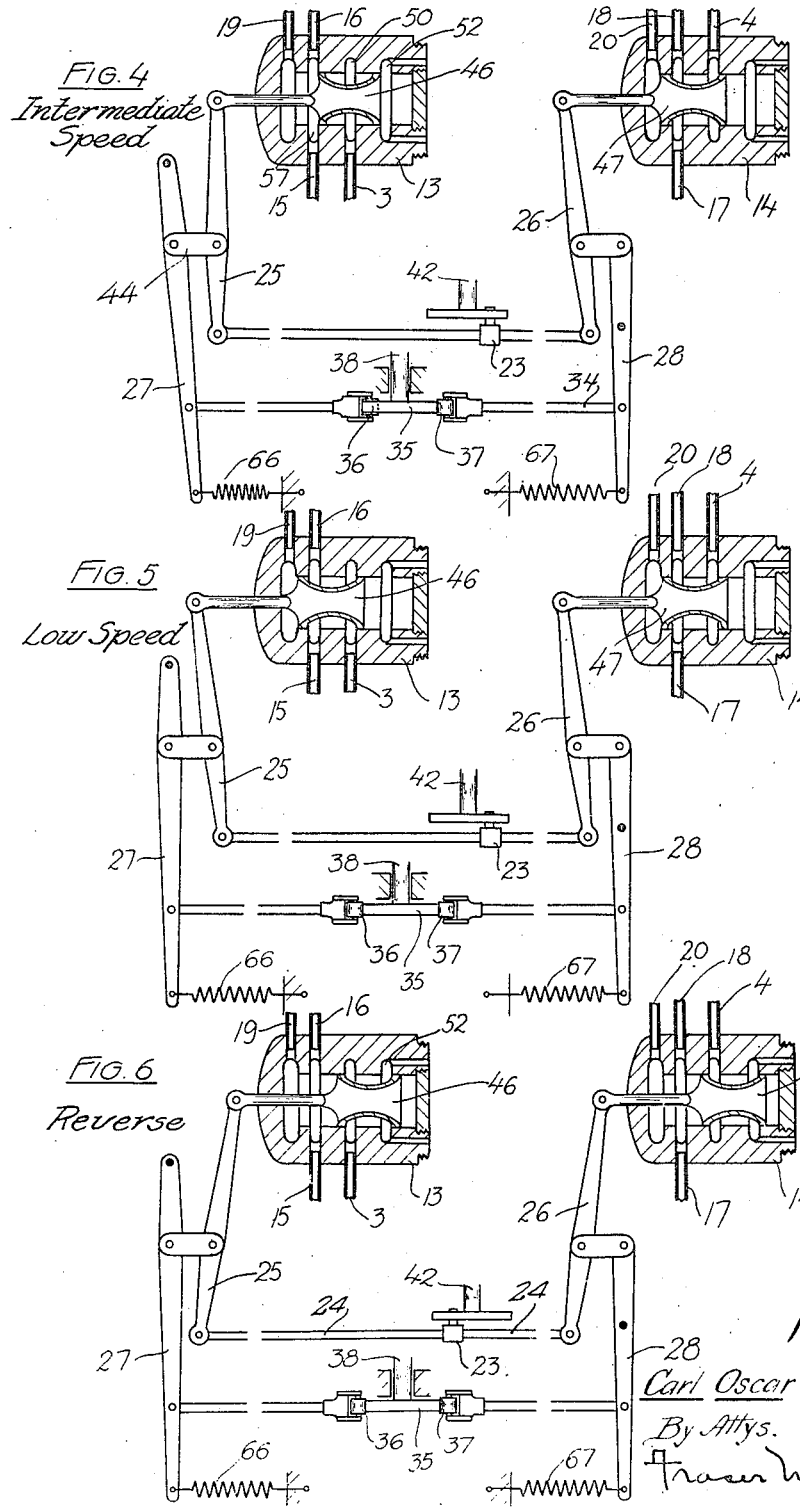

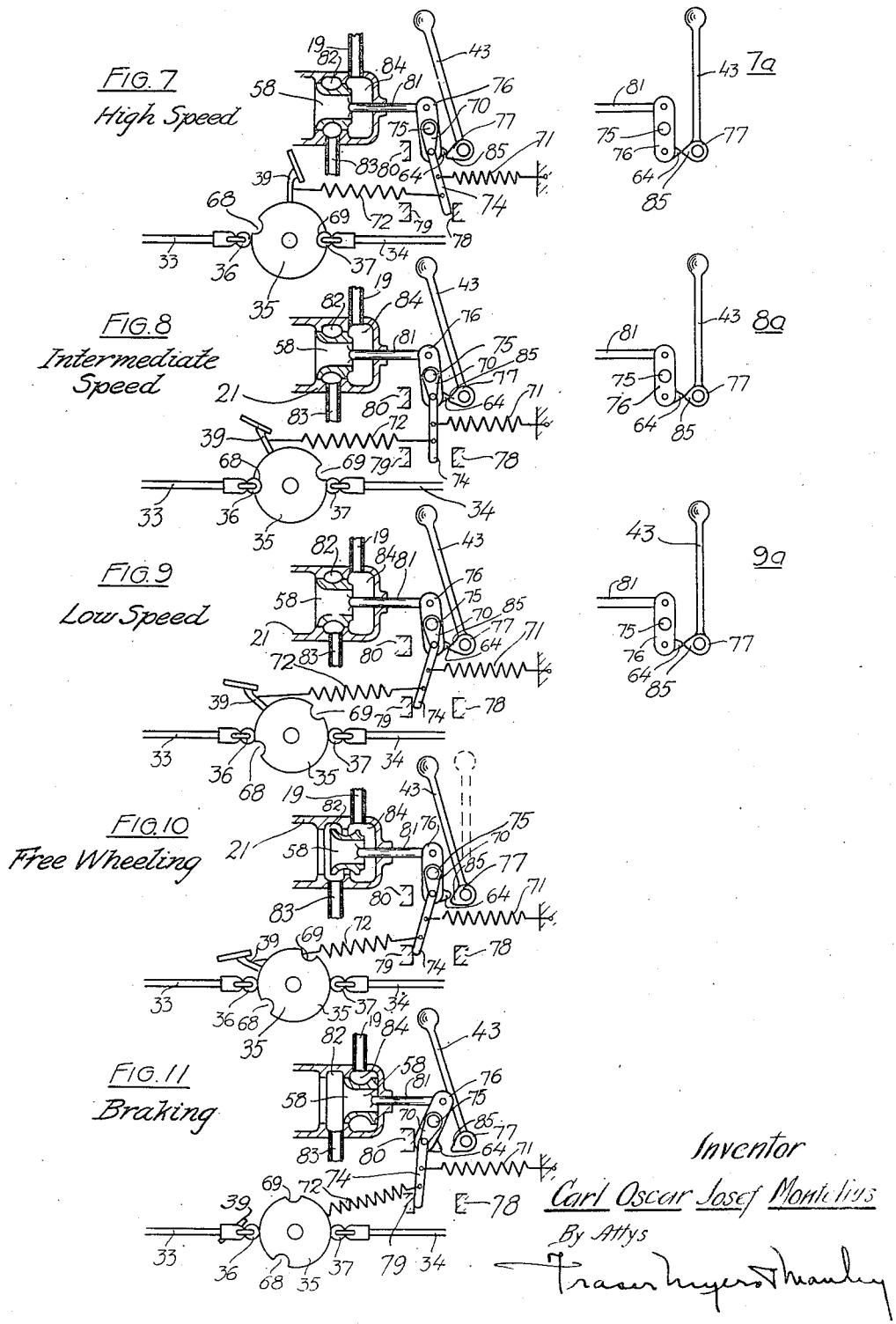

Patented Jan. 15, 1935

1,987,698

UNITED STATES PATENT OFFICE 1,987,698

HYDRAULIC DRIVING MEANS FOR VEHICLES HAVING MULTIWHEEL DRIVE

Carl Oscar Josef Montelius, Stockholm, Sweden, assignor to Aktiebolaget Imoindustri, Stockholm, Sweden, a corporation of Sweden Application March 12, 1931, Serial No. 521,952
In Sweden July 16, 1929

5 Claims. (Cl. 60—53)

The present invention relates to a hydraulic driving device for vehicles having multi-wheel drive.

An object of the invention is to bring about different ratios of gear by means of parts as simple and reliable as possible. Another object is to provide a mechanism giving a high tractive effort at low speeds and to provide a front wheel drive at high speeds. Still another object is to achieve a smooth braking effect without wear of the active parts.

According to the invention the driving device comprises at least one hydraulic motor for each of the driving wheels, a hydraulic pump driving said motors, a primary motor driving said pump, and means for varying the number of hydraulic motors in parallel.

With the above and other objects in view the invention has particular relation to certain novel features of arrangement and operation of parts, an example of which is given in this specification and illustrated in the accompanying drawings, wherein:—

Fig. 1 is a side view of a motor vehicle equipped with the driving mechanism hereinafter explained.

Fig. 2 is a plan view of the same vehicle.

Fig. 3 is in part a horizontal sectional view and in part a plan view of the principal working parts of the mechanism including the valves and the speed controlling system, in the position of the third or highest gear of the vehicle.

Fig. 3a is a detail side view of a control lever and parts connected thereto.

Fig. 4 is a fragmentary horizontal sectional view of the valve mechanism and the speed controlling system in the position of the second gear.

Fig. 5 is a fragmentary horizontal sectional view of the same parts corresponding to the first or lowest gear.

Fig. 6 is a corresponding view where the control lever is changed to reverse movement.

Fig. 7 is a vertical view of the speed controlling pedal and the principal part of its mechanism for the control of the main valve, including the valve and valve mechanism in sectional view, these parts in the position of the highest gear.

Fig. 8 is a corresponding view with the pedal placed in the position of the second gear.

Fig. 9 illustrates the same arrangement with the pedal on the lowest gear.

Figs. 7a, 8a and 9a illustrate the same arrangements as Figs. 7, 8 and 9, but with the control lever changed to the intermediate position.

Fig. 10 illustrates the same arrangement in the pedal position where the pump and motors are running idle.

Fig. 11 illustrates the pedal position when the mechanism is acting as a brake on the wheels.

Referring now more particularly to the drawings, wherein like reference numerals designate similar parts in each of the figures, the numeral 1 refers to a gasolene motor connected to a pump 2. From the pressure side of the pump 2 two conduits 3 and 4 conduct the liquid to two valve housings 13 and 14, attached on the housings of four motors 5, 6, 7 and 8. The shafts of these motors drive four wheels 9, 10, 11 and 12 by means of four double cardan joints 22. Four conduits 15, 16, 17 and 18 connect the valve housings 13 and 14 with the ends of the motors 5, 6, 7 and 8. The fluid returns from the valve housings by two return conduits 19 and 20 to a valve housing 21 attached to the pump 2.

The valves in the valve housings 13 and 14 are controlled by means of a control lever 43, rigidly secured upon rock-shaft 42. The crank 23 secured at the opposite end of said shaft 42 is connected to two other levers 25 and 26 by means of two rods 24. These levers 25 and 26 are movable around their centers 29 and 30 and control two valves 46 and 47, movable in the housings 13 and 14.

A foot pedal 39 acting upon an axle 38 controls the position of a cam disk 35. In certain positions of this disk recesses 68 and 69 therein coincide with two rollers 36 and 37. These two rollers 36 and 37 are attached to the ends of two rods 33 and 34, which are at their other ends attached to two other levers 27 and 28. These levers are respectively fulcrumed on pivots 31 and 32 fixed upon the frame 40 of the vehicle. Two springs 66 and 67 are arranged between the ends of the levers 27 and 28 and the frame of the vehicle and give the rollers 36 and 37 sufficient pressure against the disk 35. The central pivot 29 of the lever 25 is by means of a link 44 connected to the lever 27, and in the same manner the pivot 30 of the lever 26 is connected to the lever 28 by means of a link 45.

The positions of the valves 46 and 47 are thus dependent not only upon the position of the controlling lever 43 but also upon the position of the foot pedal 39 by means of the connected levers 25 and 27 or 26 and 28, respectively.

The pedal 39 also acts through a spring 72 upon a floating lever 74 movable between three abutments or stops 78, 79 and 80 (Figs. 3, and 7 to 11). The upper end of lever 74 is attached to a depending crank 70, secured to a rock-shaft 75, to the other end of which is fixedly connected another lever or cross-arm 76. The upper end of the lever 76 is connected by a rod 81 to the main valve 58 movable in the valve housing 21. Another spring 71 acting between the frame of the vehicle and a medial point of the lever 74 tends normally to hold the crank arm 70 and the parts actuated thereby in the position indicated in Fig. 7 for example; the spring 71 also acts through lever 74 to tension spring 72 whereby to normally hold the pedal lever 39 in its extreme upper position. Arranged at the lower end of the lever 76 is a wedge-shaped projection 64, which, when the parts are in the position shown in Fig. 7 for example, abuts against a disk 77 rigidly secured on the shaft 42. The said disk 77 provides a wedge-shaped cam projection 85, which, when turning the control lever 43 to its upright position (Fig. 7a), acts on the projection 64 on the lever 76 to turn said lever so that the main valve 58 connected to the upper end of said lever through rod 81, is brought to its open position independently of the position of the pedal 39.

Fig. 3 illustrates the working of the mechanism in its position for the highest speed. The pump 2 is shown as a screw pump according to the arrangement in my U. S. Patent No. 1,698,802. Two screws 48 and 49 having opposite pitch are revolved in opposite direction in the pump housing 2, the screw 48 being connected to the engine shaft 1a. When the shaft of the screw 48 is turned in the direction of the arrow, the liquid entering the pump chamber through bore 50a is forced to the pressure side (to the left) by the action of said screws and is driven to the conduits 3 and 4. In the position of the valve 46 shown in Fig. 3, the fluid coming from the conduit 3 enters the circular passageway 50 in the valve housing 13, passes on the outside of the valve 46 and through the passage 57 and the conduits 15 and 16 to the ends of the housings of the motors 5 and 6. From here the fluid returns through the central space 53 in the motor housing, the chamber 52 in the valve housing 13, the hollow valve body 46 and the conduit 19 to the suction side of the pump 2. The said motors 5 and 6 are constructed in the same way as is the pump 2. The power screws 55 and 56 of the forward motors 5, 6, are connected respectively to the front driving wheels of the vehicle but are movable independent of each other. The companion screws 55a and 56a, cooperating with power screws 55 and 56 respectively, are arranged according to the same principle as is the companion screw 49 which coacts with the driving screw 48 of pump 2. The two pairs of screws 55 and 55a on the one side and 56 and 56a on the other side of the forward motor housing are arranged symmetrically and the pressure on both pairs being exactly the same, the tractive power will be exactly the same for both front wheels.

The second conduit 4 leading from the pressure side of the pump 2 to the rear valve housing 14 connects the pump with the circular passageway 51 in the valve housing 14. In the position of the valve 47, illustrated in Fig. 3, this passageway is closed from the other passages in the housing 14. On the other side, the central space 60 between the motors 7 and 8 is connected to the passageway 59 and is accordingly by means of the central passage 47a in the valve 47 in connection with the two conduits 17 and 18 leading to the ends of the same motors 7 and 8. The fluid is thus free to circulate between the intake and exhaust ends of the said motors. The screws 61 and 62 together with their cooperating screws 61a and 62a arranged in the same way in the motors 7 and 8 as the screws of the motors 5 and 6 previously described, will therefore rotate free and without any tractive power nor any braking effect on the rear wheels 11 and 12. The vehicle is accordingly in this position of the valves driven only by front wheel drive which, in the preferred embodiment, is designed to impart to vehicles the highest speed for any given speed of the engine-driven pump 2.

The position of the valves 46 and 47 shown in Fig. 3 corresponds to the "high-speed" position of the pedal 39 shown in Fig. 7. The control lever 43 being placed in its forward speed position would, by means of the crank 23 and the rods 24 move both the levers 25 and 26 to the position, where both valves 46 and 47 are in their left end positions were it not for the fact that the spring 67 draws the lever 28 to the left, the roller 37 on the rod 34 entering into the recess 69 presented in the disk 35 when the disk occupies the position corresponding to the said "high speed" position of the speed ratio control pedal 39. The valve 47 is therefore replaced into its middle position, as above described.

The position of the valves 46 and 47 and the control system corresponding to the "intermediate speed" position is illustrated by Fig. 4. This setting of the valves is obtained by depressing the speed-ratio control pedal whereby to rotate the cam disk 35 to the position indicated in Fig. 8. This movement of the cam disk throws rod 34 to the right and thus through the linkage provided by levers 28 and 26 shifts valve 47 to its left position. On the other hand the cam recess 68 is brought into alignment with roller 36, and the spring 66 moves rod 33 to the right, such motion being transmitted through the lever 27, link 44 and lever 25 to shift the valve 46 to the position illustrated in Fig. 4. The relationship of the valves in Fig. 4 differs from that in Fig. 3 in that the relative positions of the valves are interchanged, the valve 46 now occupying its middle position, while the valve 47 occupies its left end position. The conditions of these valves are therefore just opposite that in Fig. 3. In Fig. 4 the passage 50 and the conduit 3 are closed, the motors 5 and 6 therefore run idle but all the fluid from the pump will be forced through the conduit 4 to the rear valve house 14 and to the rear motors 7 and 8 in exactly the same way as above described regarding the front wheel motors 5 and 6 in Fig. 3. Fig. 4 differs accordingly from Fig. 3 in that the rear wheels instead of the front wheels are driven. The rear wheel motors 7 and 8 drive the rear wheels 11 and 12 in the same way that the front wheel motors drive the front wheels but in a different speed ratio. This is accomplished directly and in a very simple and efficient manner by making the fluid displacement or fluid capacity of the rear motors somewhat larger per revolution of the rear wheels, than the capacity of the forward motors per revolution of the front wheels. I have found it appropriate to give the rear wheel motors about 50% larger capacity than the front wheel motors. The tractive effort at the wheels will therefore be about 50% greater when obtaining the intermediate speed drive through the rear wheels than when obtaining high speed drive through the front wheels. Correspondingly the speed of the vehicle in intermediate speed will be only ⅔ as great as in high speed. When the pedal 39 is placed in its third or "low-speed" control position (Fig. 9) which corresponds to the valve setting shown in Fig. 5, both cam disk recesses 68 and 69 are out of alignment with cam rollers 36, 37, and rods 33, 34, are held in such position that the valves 46 and 47 are both caused to assume their left end positions. The fluid from the pump 2 will therefore pass through both pairs of motors, thus driving all the four wheels 9, 10, 11 and 12 of the vehicle and establishing the condition of "first" or "low-speed" driving ratio. In this condition the speed is reduced to 40% and the tractive effort is 2.5 times as great as that obtained in the "high-speed" drive condition wherein only the front wheel motors are delivering power.

In the further depressed positions of pedal 39 (Figs. 10 and 11) the position of the valves 46 and 47 remain unchanged, the radius of cam disk 35 being uniform throughout the arcs between recesses 68 and 69. The said valves thus continue to occupy the position shown in Fig. 5. The main valve 58 that previously occupied the position shown in Figs. 7, 8 and 9, wherein it closed the inlet 82 of conduit 83, is now, however, displaced by the action of pedal 39. In the previously described position of pedal 39 (Fig. 7) the force of spring 71 exceeding that of spring 72 drew the lever 74 against stop 78. The lower end of cross-arm 76, through the connections comprising crank 70 and shaft 75, was also urged against the wedge-shaped cam projection 85 carried on the control lever shaft 42. However, when the pedal 39 is moved to the positions indicated in Figs. 8 and 9 the increased tension of spring 72 will progressively swing the lower end of lever 74 toward the left, but because of the relative tension then obtaining between springs 71 and 72 which act at different points on the floating lever 74, the upper end of said lever will not move, and consequently will not alter the position of crank 70, which is connected to the upper end thereof. It will be observed that in Fig. 9 the lower end of floating lever 74 has reached the stop 79, and when the pedal is moved into its next position (Fig. 10) the floating lever has a fulcrum point against abutment 79, and being acted upon by the further increased tension of spring 72 due to the further movement of pedal 39, now overcomes the opposing tension of spring 71 so that the upper end of the floating lever 74 swings to the left, thereby turning crank 70 and shaft 75 in a clockwise direction, the valve 58, connected to the upper end of cross-arm 76 through valve rod 81 being thereby shifted to the right, so that said valve establishes communication between by-pass conduit 83 and the suction chamber 84 of the main driving pump. The pump 2 thereafter idly circulates its contained fluid without generating any pressure; the motors 5, 6, 7 and 8 likewise running idle and circulating their fluid through the same by-pass. In this condition corresponding to the pedal position shown in Fig. 10, the vehicle is in the neutral drive condition, or what is now known as "free wheeling". Regardless of whether the speed-ratio control pedal 39 is set for high, intermediate or low speed drive, if the control lever 43 is placed in its upright position, as indicated in Figs. 7a, 8a, 9a, or as shown in Fig. 10 by dotted lines, the pump valve 58 will be set for the "free wheeling" condition. When the hand operated lever 43 is shifted to the said upright position, the cam projection 85 on disk 77 acts upon projection 64 at the lower end of the lever or cross-arm 76, thereby swinging the latter in a clockwise direction and moving the valve 58 to its open position. This action of the control lever 43 gives the same "free wheeling" condition that is otherwise obtained when the foot pedal 39 is depressed to the Fig. 10 position, as hereinbefore described.

The extreme downward movement of pedal 39 (Fig. 11) brings about the braking of the vehicle. The floating lever 74 is moved bodily to the left by the action of spring 72, the upper end of said lever being drawn against stop 80 (the lower end of the lever having previously been brought into contact with stop 79). The pump valve 58 is now in its extreme position to the right, where the passage 82 communicating with by-pass 83 is open, but passage 84 communicating with the fluid return conduit 19 is blocked by the hollow valve body 58. The pump 2 now circulates the fluid through the conduit 83, but the fluid passing from the motors 5, 6, 7 and 8 through the conduits 19 and 20 is obstructed by valve 58. This obstruction of the passage of the fluid causes a pressure at the outlets of these motors, giving a braking effect on the wheels. When the pressure in the passageway 84 has reached a certain value it will force the valve 58 to conquer the tension in the spring 72, opening a small passage for the fluid between the valve 58 and the valve housing 21. The braking effect on the wheels will accordingly be dependent on the tension of the spring 72 and may thus be controlled by the pedal 39.

Fig. 6 shows the setting of the valves for reverse drive. When the control lever 43 is shifted to reversing position the crank 23 at the opposite end of the rock-shaft 42 is swung to the left. This crank actuates rods 24 which move the levers 25 and 26 to their left-hand position, the valves 46 and 47 being thereby shifted to their extreme right-hand position. The difference between the valve setting in Figs. 5 and 6 is that the fluid entering into the valve housings 13 and 14 by the conduits 3 and 4 will pass through the motors 5, 6, 7 and 8 in opposite directions. The vehicle will accordingly be propelled backwards instead of forwards with the valves set as shown in Fig. 6. Since both the forward and rear pairs of motors are receiving fluid from the pump in reverse drive, the driving ratio is the same as for low speed. In reverse drive the fluid returns to the pump through conduits 19 and 20 just as it does in forward drive. When, during reverse drive, the pedal 39 is depressed to the braking position as shown in Fig. 11 a braking effect on the wheels will take place exactly in the same manner as when the vehicle is moving forwards. The braking effect is accordingly independent of the direction of the movement. The braking on the wheels will be in the same proportion as the tractive power and all four wheel motors will always act as brakes.

It is not necessary to connect the wheel motors 5, 6, 7 and 8 directly to the wheels 9, 10, 11 and 12 by the cardan joints 22. By inserting ordinary gears between each motor and a cardan joint, smaller motors may be used. It is therefore possible to use the same type of motor for each pair of wheels, if the mechanical gear ratio of the forward pair of wheels is suitably related to that of the rear pair, as, for example, in the previously considered ratio of 1 to 1.5.

The arrangement described has very few moving parts and these are of simple and rugged character. Practically all the weight of the driving mechanism is placed on the car body and is supported by the springs. The invention in its preferred embodiment presents the advantage of a front wheel drive at high speeds combined with various driving ratios obtained through the employment of other pairs of wheels singly or in combination when greater tractive effort is required. No special brakes are necessary and the braking effect is perfectly smooth and noiseless. The hyraulic drive is silent in all ratios and the change from one ratio to another is always noiseless.

While the invention has been described as applied to a conventional four wheel vehicle, it is to be understood that various features of the invention are not limited thereto but are applicable to any form of vehicle having two or more wheels. If more than four driving wheels are provided, the number of possible driving ratios, as well as the maximum tractive effort, is correspondingly increased. The invention may otherwise be variously modified and embodied without departing from the spirit thereof as set forth in the following claims.

What I claim is:—

1. A driving device for vehicles having four-wheel drive, comprising at least one hydraulic motor for each of said driving wheels, the motors driving the front wheels being connected in parallel and having the same tractive effort, and the motors driving the rear wheels being connected in parallel and having the same tractive effort, said latter tractive effort being greater than that of the front wheel motors, a hydraulic pump driving said motors, a primary motor driving said pump, supp'y conduits and discharge conduits between said pump and said motors, and a valve device in said conduits, said valve device being controllable in such manner as to connect either the motors of all four wheels or the rear wheel motors only or the front wheel motors only to said pump.

2. A driving device for vehicles having both front and rear wheel drives, comprising a hydraulic motor for each of said driving wheels, the motors of the front driving wheels being arranged to exert a lesser tractive effort than the motors of the rear driving wheels when acting under the same fluid pressure, a hydraulic pump, a prime mover for said pump, conduits connecting the said motors in parallel with said pump, and a valve device controlling in common the discharge of fluid from the said parallel connected hydraulic motors, the operation of said valve device simultaneously varying the braking action on each of the driven wheels of the vehicle, the braking action on both rear wheels and on both front wheels being equalized, but as between the front and rear wheels the braking effect being of different intensity, the front wheel braking effect being proportionately less than that of the rear wheels in the predetermined ratio of their said tractive efforts.

3. A driving device for vehicles having multi-wheel drive, comprising a hydraulic motor for each of said driving wheels, the motors associated with the front pair of driving wheels being hydraulically connected in parallel and motors associated with the rear wheels being hydraulically connected in parallel, and producing a different tractive effort than that produced by the motors associated with the front pair of said driving wheels, a power driven pump hydraulically connected with said motors, by-passes for short-circuiting the fluid of the motors of each of said pairs of driving wheels, valve mechanism adapted to control said by-passes and to determine both selectively and in combination, the fluid circulation between the said pump and the motors of different pairs of driving wheels, and a movable control element adapted in one position to set said valve mechanism to permit the circulation of fluid between said pump and the combined motors of both pairs of driving wheels, said element in a plurality of other positions setting said valve mechanism to selectively determine the circulation of fluid to the motors of either of the pairs of driving wheels, the by-pass of the motors of a pair of driving wheels thereby cut off from the circulation of the pump, being opened by the same setting of the said control element.

4. A driving device for vehicles having four-wheel drive, comprising at least one hydraulic motor for each of said driving wheels, the motors driving the front wheels being connected in parallel and having the same tractive effort, and the motors driving the rear wheels being connected in parallel and having the same tractive effort, said latter tractive effort being different from that of the front wheel motors, a hydraulic pump driving said motors, a primary motor driving said pump, supply conduits and discharge conduits between said pump and said motors, and a valve device in said conduits, said valve device being controllable in such manner as to connect either the motors of all four wheels or the rear wheel motors only or the front wheel motors only to said pump.

5. A driving device for vehicles having both front and rear wheel drives, comprising a hydraulic motor for each of said driving wheels, the motors of the front driving wheels being arranged to exert a different tractive effort from that exerted by the motors of the rear driving wheels when acting under the same fluid pressure, a hydraulic pump, a prime mover for said pump, conduits connecting the said motors in parallel with said pump, and a valve device controlling in common the discharge of fluid from the said parallel connected hydraulic motors, the operation of said valve device simultaneously varying the braking action on each of the driven wheels of the vehicle, the braking action on both rear wheels and on both front wheels being equalized, but as between the front and rear wheels the braking effect being of different intensity, the front wheel braking effect being proportionately different from that of the rear wheels in the predetermined ratio of their said tractive efforts.

CARL OSCAR JOSEF MONTELIUS.